United States Patent
Borella et al.

(10) Patent No.: US 6,643,259 B1
(45) Date of Patent: Nov. 4, 2003

(54) METHOD FOR OPTIMIZING DATA TRANSFER IN A DATA NETWORK

(75) Inventors: Michael S. Borella, Naperville, IL (US); Nurettin B. Beser, Evanston, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/438,238

(22) Filed: Nov. 12, 1999

(51) Int. Cl.[7] .............................. H04J 3/14; H04J 12/56
(52) U.S. Cl. ................... 370/231; 370/252; 370/395.21
(58) Field of Search ................................. 370/229, 231, 370/232, 235, 252, 395.21, 395.43, 230, 230.1, 233, 234, 237, 238, 253

(56) References Cited

U.S. PATENT DOCUMENTS 5,400,329 A * 3/1995 Tokura et al. ............... 370/232
6,442,164 B1 * 8/2002 Wu ........................ 370/395.21

OTHER PUBLICATIONS

"Internet Engineering Task Force", Request for Comments 768 User Datagram Protocol, Aug. 1980, pp. 1 to 3.
"Internet Engineering Task Force", Request for Comments 791, Internet Protocol DARPA Internet Program Protocol Specification, Sep. 1981, pp. i to 45.
"Internet Engineering Task Force", Request for Comments 792, Internet Control Message Protocol DARPA Internet Program Protocol Specification, Sep. 1981, pp. 1 to 21.
"Internet Engineering Task Force", Request for Comments 793, Transmission Control Protocol DARPA Internet Program Protocol Specification, Sep. 1981, pp. i to 85.
"Internet Engineering Task Force", Request for Comments 1323, TCP Extensions for High Performance, May 1992, pp. 1 to 37.
"Internet Engineering Task Force", Request for Comments 2001, TCP Slow Start, Congestion Avoidance, Fast Retransmit, and Fast Recovery Algorithms, Jan. 1997, pp. 1 to 6.
"Internet Engineering Task Force", Request for Comments 2005, Applicability Statement for IP Mobility Support, Oct. 1996, pp. 1 to 5.

(List continued on next page.)

Primary Examiner—Chau Nguyen
Assistant Examiner—Soon-Dong Hyun
(74) Attorney, Agent, or Firm—McDonnell Boehnen Hulbert & Berghoff

(57) ABSTRACT

The present invention relates to a method for optimizing data flow in a data network. Data that is to be transferred across the network at a constant bitrate is handled differently by a Transmission Control Protocol (TCP) layer compared to other data. A TCP congestion control process is adapted to recognize whether data packets from an application are to be transferred across the data network at a constant bitrate. The constant bitrate channel may be recognized by a Quality of Service identifier or a TCP port number. If the data packets do belong to the constant bitrate channel, the TCP congestion control limits the congestion window for these data packets. The congestion window for data packets other than those in the constant bitrate channel is allowed to increase, as usual, until data packets are lost, at which point the congestion window is reduced to a maximum segment size. The congestion window for constant bitrate packets, however, is increased until it reaches a maximum value. The limiting value of the congestion window is the constant bitrate multiplied by the round trip delay time between sending a packet and receiving its acknowledgement. The modifications to the TCP process may provide for the transmission of constant bitrate data over the data network that does not experience a timeout.

17 Claims, 11 Drawing Sheets

OTHER PUBLICATIONS

"Internet Engineering Task Force", Request for Comments 2212, Specification of Guaranteed Quality of Service, Sep. 1997, pp. 1 to 20.

"Internet Engineering Task Force", Request for Comments 2475, An Architecture for Differentiated Services, Dec. 1998, pp. 1 to 36.

"Internet Engineering Task Force", Request for Comments 2581, TCP Congestion Control, Apr. 1999, pp. 1 to 14.

"Internet Engineering Task Force", Request for Comments 2582, The New Reno Modification to TCP's Fast Recovery Algorithm, Apr. 1999, pp. 1 to 12.

"Internet Engineering Task Force", Request for Comments 2598, An Expedited Forwarding PHB, Jun. 1999, pp. 1 to 11.

"Internet Engineering Task Force", Internet Draft, The Rate–Halving Algorithm for TCP Congestion Control, Aug. 1999, pp. 1 to 17.

"Internet Engineering Task Force", Internet Draft, Computing TCP's Retransmission Timer, Oct. 1999, pp. 1 to 5.

"Internet Engineering Task Force", Internet Draft, Fast–TCP: An enhancement to the current TCP, Nov. 1999, pp. 1 to 9.

"Internet Engineering Task Force", Internet Draft, TCP Congestion Window Validation, Dec. 1999, pp. 1 to 11.

\* cited by examiner

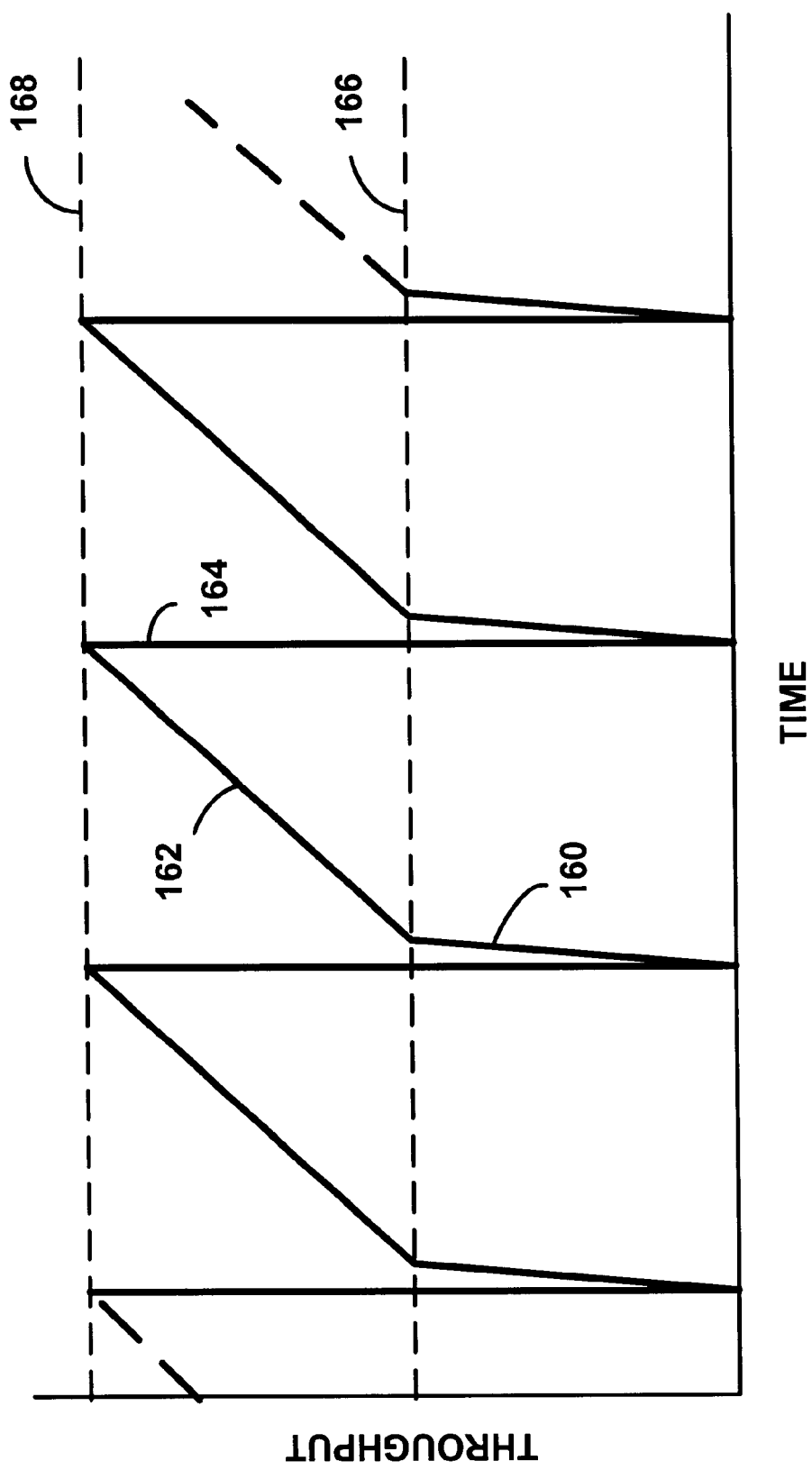

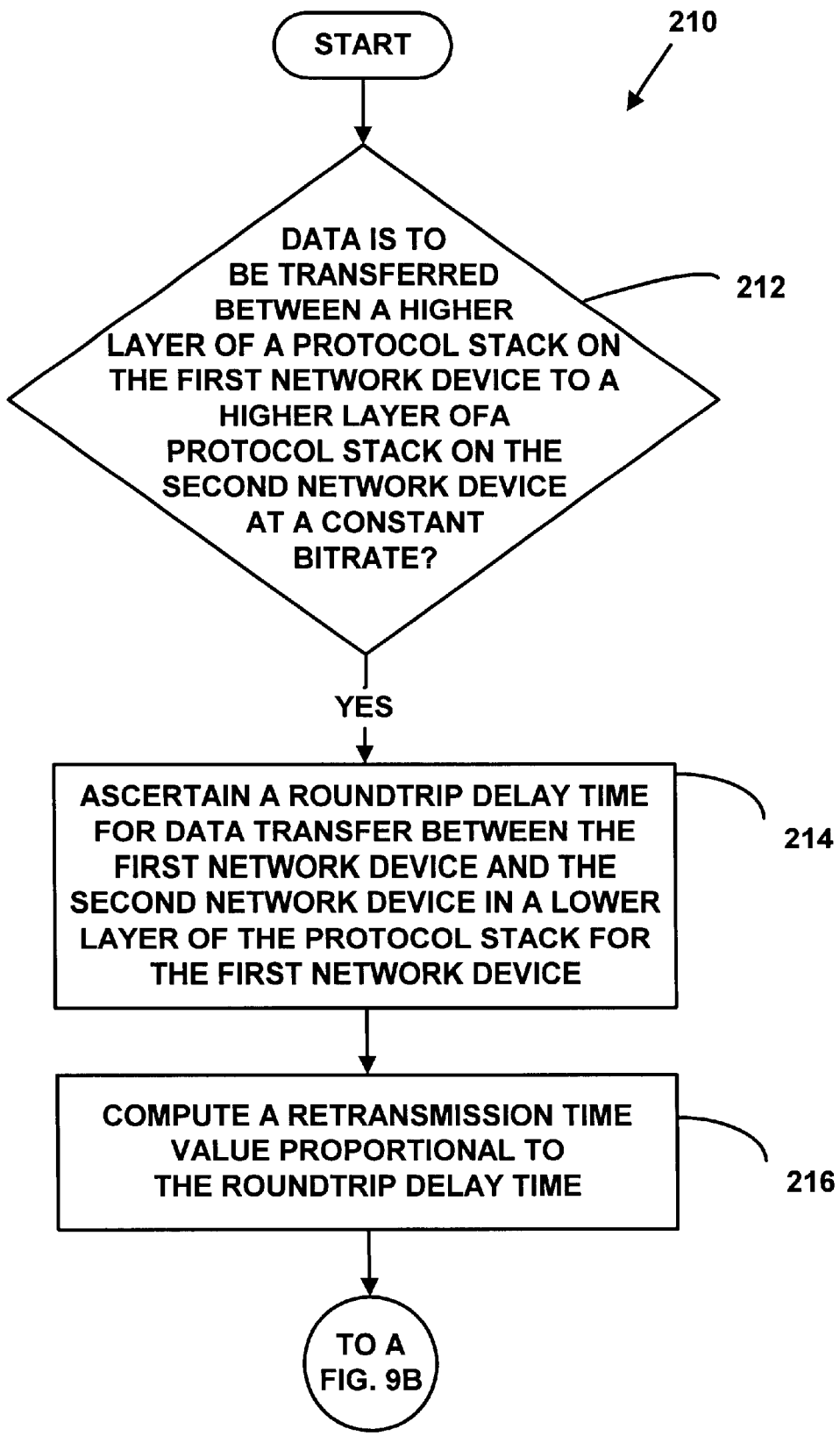

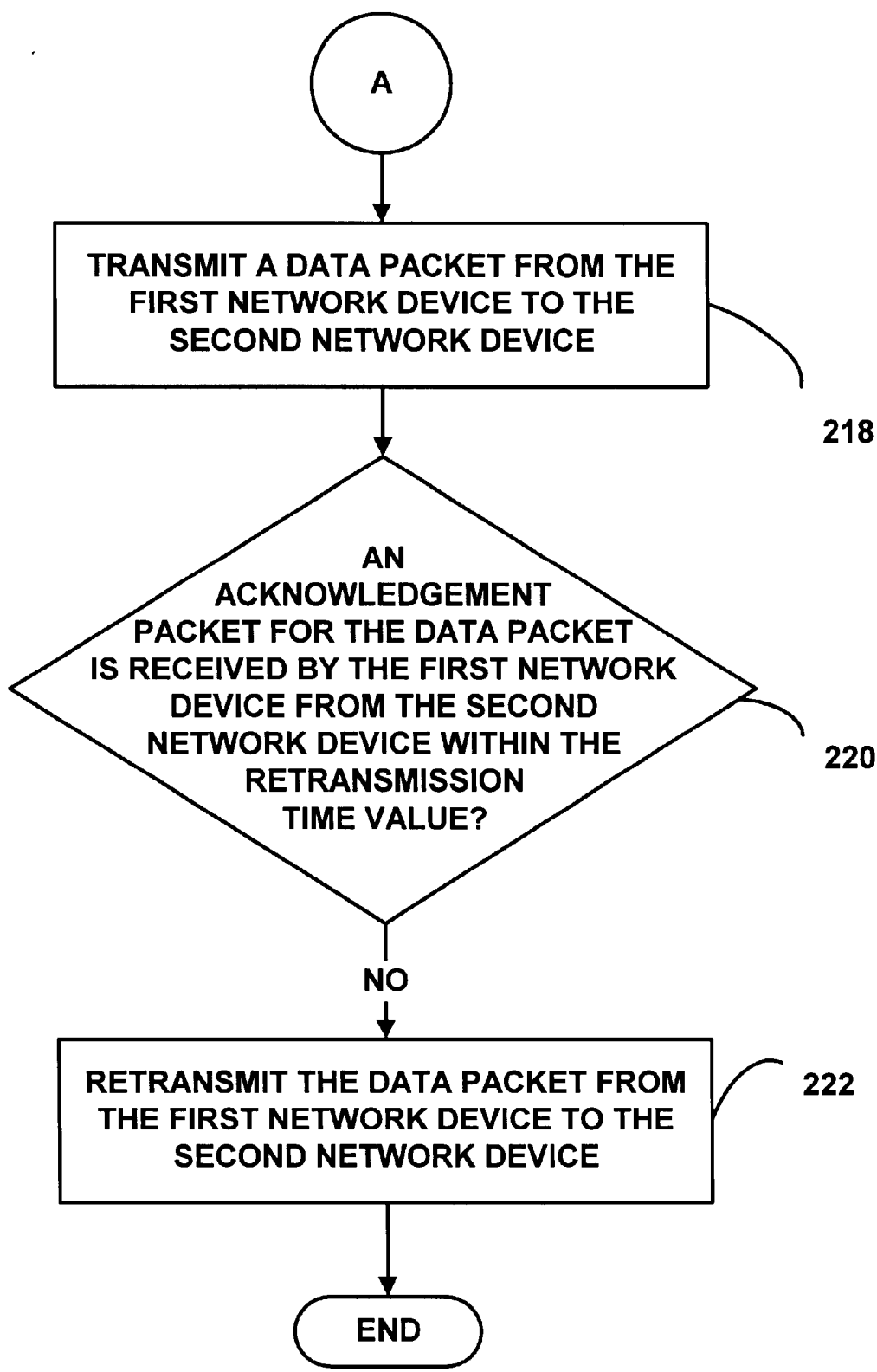

METHOD FOR OPTIMIZING DATA TRANSFER IN A DATA NETWORK

FIELD OF INVENTION

The present invention relates to communications in data networks. More specifically, it relates to a method for optimizing data transfer in data networks.

BACKGROUND OF THE INVENTION

Transmission Control Protocol ("TCP") has been developed and modified for congestion-conscious behavior over a public Internet. Upon connection startup, TCP tentatively probes the network to determine how much marginal bandwidth is available between the source and destination. When encountering congestion, TCP backs off dramatically. TCP's timeout-and-retransmission scheme is based on a running estimate of round-trip delay and delay variation. These mechanisms have proven to scale very well with the growth of the Internet and to perform in a reasonable fashion over an end-to-end channel that exhibits variable available bandwidths, delays and delay variances.

Quality of Service ("QoS"), however, is becoming a more important issue for data networks. Networks may soon be expected to support a variety of channels including channels that guarantee dedicated end-to-end bandwidth, low delays, and extremely low (nearly negligible) delay variance. Such constant bitrate ("CBR") channels are preferred for the streaming transfer of data such as within a virtual private network. QoS is the method by which Internet Service Providers ("ISPs") may guarantee bandwidth for the CBR channels. In addition, QoS may provide a user acceptable charging framework wherein a user is charged by the ISP according to which type of channel he uses.

Unfortunately, TCP was not designed with this sort of underlying network behavior in mind and it is not surprising to find that existing TCP will not perform well in CBR environments. In particular, TCP's window probing and round-trip delay estimation processes cause TCP to artificially limit throughput on CBR channels.

It is therefore desirable to improve the performance of a Transmission Control Protocol process for transferring data over a data network at a constant bitrate. Accommodating the transmission requirements for constant bitrate channels may improve the overall performance of the data network.

SUMMARY OF THE INVENTION

In accordance with preferred embodiments of the present invention, some of the problems associated with optimizing data transfer in a data network are overcome. Methods for optimizing data transfer are provided. One aspect of the invention includes a method for optimizing data transfer from a first network device to a second network device. The method includes determining whether data is to be transferred between a higher layer of a protocol stack for the first network device to a higher layer of a protocol stack for the second network device at a constant bitrate. If so, a roundtrip delay time for data transfer between the first network device and the second network device is ascertained in a lower layer of the protocol stack for the first network device. In one preferred embodiment of the present invention, the roundtrip delay time is a measure of congestion in the data network. A maximum congestion window is computed, in response to the constant bitrate multiplied by the roundtrip delay time. A congestion window value is obtained from a congestion control process in the lower layer of the protocol stack for the first network device. The congestion control process regulates the amount of data that is passed from the higher layer of the protocol stack to the lower layer of the protocol stack. An amount of data is transferred from the higher layer of the protocol stack for the first network device to the lower layer of the protocol stack for the first network device equal to a minimum of the congestion window value and the maximum congestion window.

Another aspect of the invention includes a method for optimizing data transfer from a first network device to a second network device. This method includes determining whether data is to be transferred between a higher layer of a protocol stack for the first network device to a higher layer of a protocol stack for the second network device at a constant bitrate. If so, a roundtrip delay time for data transfer between the first network device and the second network device is ascertained in a lower layer of the protocol stack for the first network device. In one preferred embodiment of the present invention, the roundtrip delay time is a measure of congestion in the data network. A retransmission time value proportional to the roundtrip delay time is computed. The retransmission time value is different than for data transfer at a nonconstant bitrate. A data packet is transmitted from the first network device to the second network device. The data packet is associated with the data that is transferred at the constant bitrate. A determination is made as to whether an acknowledgement packet for the data packet is received by the first network device from the second network device within the retransmission time value, and if not, the data packet is retransmitted from the first network device to the second network device.

For example, the methods of the present invention may provide for near optimal data throughput on a constant bitrate channel. The methods described herein may allow a Transmission Control Protocol process to transmit constant bitrate traffic more efficiently. The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 6 is a diagram illustrating the throughput of a Transmission Control Protocol process;

FIG. 9 is a flow diagram illustrating a method for optimizing data transfer in a data network.

DETAILED DESCRIPTION OF PREFERRED EMBODIMENTS

Figure 1:
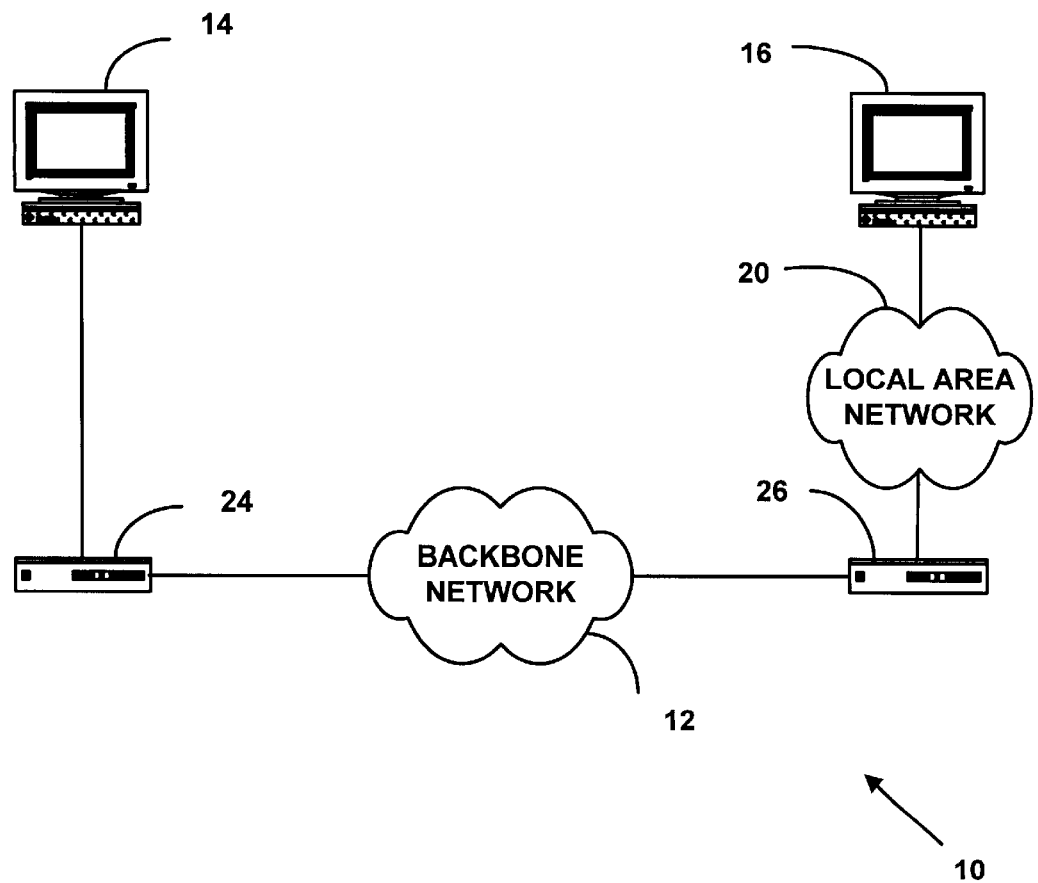
FIG. 1 is a block diagram illustrating a network system.

FIG. 1 is a block diagram illustrating an exemplary data network 10 for an illustrative embodiment of the present invention. The data network 10 includes a backbone network 12 (e.g. the Internet or a campus network), a first network device 14, and a second network device 16. The backbone network 12 may be public in the sense that it may be accessible by many users who may monitor communications on it. Additionally, there may be multiple local area networks ("LANs") 20. Data packets may be transferred to/from the first network device 14 and the second network device 16 over the backbone network 12. For example, the devices may be assigned public network addresses on the Internet. The data channel between the first network device 14 and the second network device 16 may include routers or gateways (24, 26). However, other data network types and network devices can also be used and the present invention is not limited to the data network and network devices described for an illustrative embodiment.

For example, the routers (24, 26) may be edge routers. An edge router routes data packets between one or more networks such as the a public network (e.g. backbone network 12) and LANs (e.g. private network 20). Edge routers include those provided by 3Com Corporation of Santa Clara, Calif., Cisco Systems of San Jose, Calif., Lucent Technologies of Murray Hill, N.J., Lucent subsidiaries including Livingston Enterprises, Inc. of Pleasanton, Calif., and Ascend Communications of Alameda, Calif., and others.

In one exemplary preferred embodiment of the present invention, these first 14 and second 16 network devices are telephony devices or bulk data devices. Bulk data devices include Web-TV sets and decoders, interactive video-game players, or personal computers running multimedia applications. Telephony devices include Voice over Internet Protocol ("VoIP") devices (portable or stationary) or personal computers running facsimile or audio applications. However, the ends of the data flow may be other types of network devices and the present invention is not restricted to telephony or bulk data devices.

Network devices and routers for preferred embodiments of the present invention include network devices that can interact with network system 10 based on standards proposed by the Institute of Electrical and Electronic Engineers ("IEEE"), International Telecommunications Union-Telecommunication Standardization Sector ("ITU"), Internet Engineering Task Force ("IETF"), or Wireless Application Protocol ("WAP") Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The WAP standards can be found at the URL "www.wapforum.org." It will be appreciated that the configuration and devices of FIG. 1 are for illustrative purposes only and the present invention is not restricted to network devices such as edge routers, and telephony or bulk data devices. Many other network devices are possible. Moreover, the configuration of data network 10 is not restricted to one backbone network 12 and one LAN 20 as shown in FIG. 1. Many different configurations of the data network 10 with multiple data networks and/or multiple local area networks at various positions in the data network configuration 10 are possible.

An operating environment for network devices and modified routers of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals or biological signals by the CPU. An electrical system or biological system represents data bits which cause a resulting transformation or reduction of the electrical signals or biological signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Network Device Protocol Stack

Figure 2:
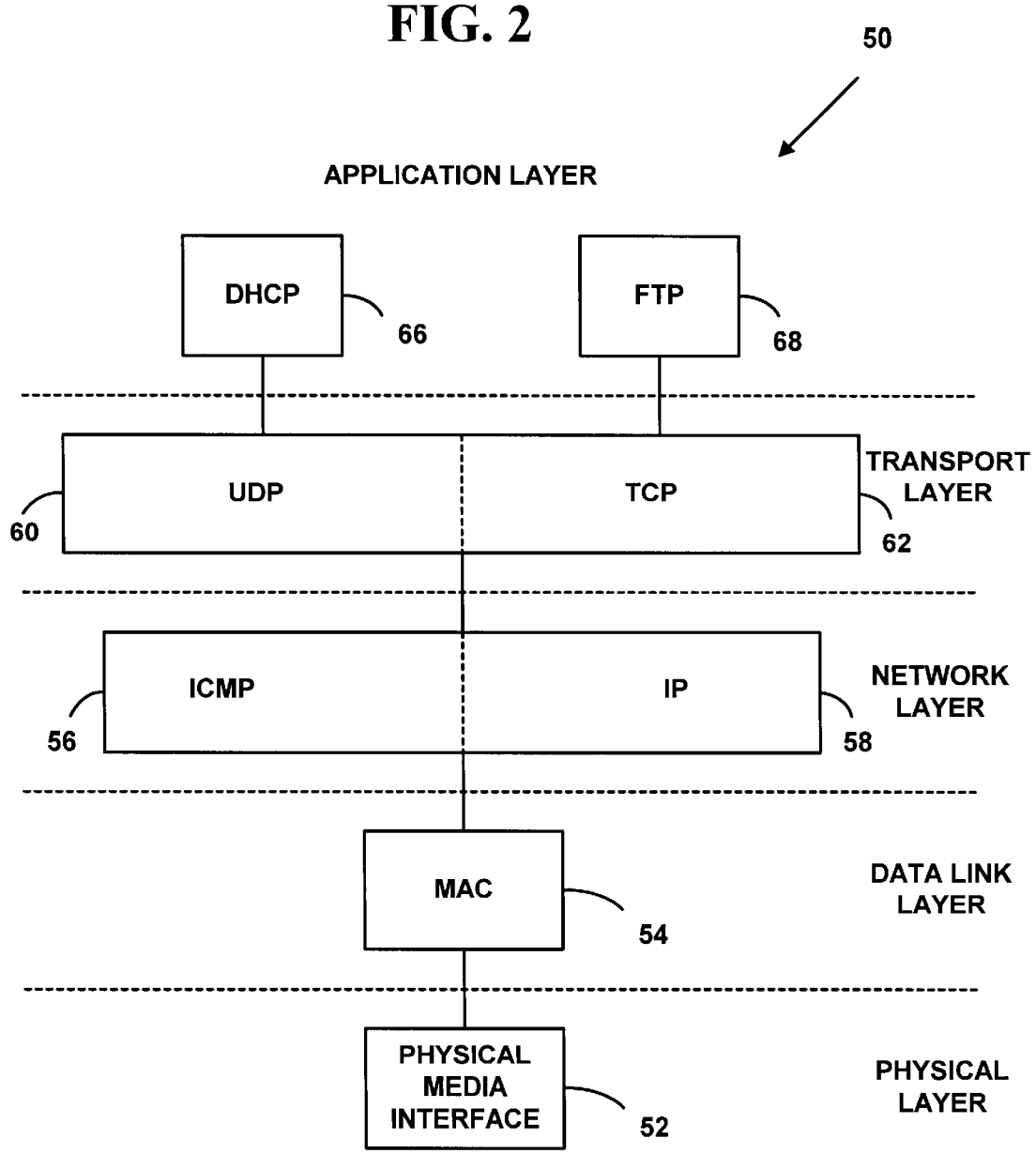
FIG. 2 is a block diagram illustrating a protocol stack for a network device.

FIG. 2 is a block diagram illustrating a protocol stack 50 for network devices in data network 10. As is known in the art, the Open System Interconnection ("OSI") model is used to describe computer networks. The OSI model consists of seven layers including from lowest-to-highest, a physical, data-link, network, transport, session, presentation, and application layer. The physical layer transmits bits over a communication link. The data link layer transmits error free frames of data. The network layer transmits and routes data packets.

The lowest layer of the protocol stack is the physical layer. The physical layer includes the physical media interfaces 52 that place signals on transmission media such as wires, coaxial cable, optical fiber, or transmit them as electromagnetic waves. The physical media interfaces 52 also read signals from the transmission media and present them to the data-link layer.

In the data-link layer is a Medium Access Control ("MAC") layer 54. As is known in the art, the MAC layer 54 controls access to a transmission medium via the physical layer. For more information on the MAC layer protocol 54 see IEEE 802.3 for Ethernet and IEEE 802.14 for cable modems. However, other MAC layer protocols 54 could also be used and the present invention is not limited to IEEE 802.3 or IEEE 802.14.

Above the data-link layer is an Internet Protocol ("IP") layer 58. The IP layer 58, hereinafter IP 58, roughly corresponds to OSI layer 3, the network layer, but is typically not defined as part of the OSI model. As is known in the art, the IP 58 is a message addressing and delivery protocol designed to route traffic within a network or between networks. For more information on the IP 58 see RFC-791 incorporated herein by reference.

The Internet Control Message Protocol ("ICMP") layer 56 is used for network management. The main functions of the ICMP layer 56, hereinafter ICMP 56, include error reporting, reachability testing (e.g., "pinging") congestion control, route-change notification, performance, subnet addressing and others. Since the IP 58 is an unacknowledged protocol, datagrams may be discarded and the ICMP 56 is used for error reporting. For more information on the ICMP 56 see RFC-792 incorporated herein by reference.

Above the IP 58 and the ICMP 56 is a transport layer with a User Datagram Protocol layer 60 ("UDP"). The UDP layer 60, hereinafter UDP 60, roughly corresponds to OSI layer 4, the transport layer, but is typically not defined as part of the OSI model. As is known in the art, the UDP 60 provides a connectionless mode of communications with datagrams. For more information on the UDP 60 see RFC-768 incorporated herein by reference. The transport layer may also include a connection-oriented Transmission Control Protocol ("TCP") layer 62. For more information on TCP see RFC-793 and RFC-1323 incorporated herein by reference. TCP 62 is discussed in more detail below.

Above the transport layer is an application layer where the application programs that carry out desired functionality for a network device reside. For example, the application programs for the network device 16 may include printer application programs, while application programs for the network device 14 may include facsimile application programs.

In the application layer are typically a Dynamic Host Configuration Protocol ("DHCP") layer 66 and a File Transfer Protocol ("FTP") layer 68. The DHCP layer 66 is a protocol for passing configuration information to hosts on an IP 58 network. For more information on the DHCP layer 66 see RFC-1541 incorporated herein by reference. The FTP layer 68 is a file transfer protocol used to download files and configuration information. For more information on the FTP layer 68 see RFC-959 incorporated herein by reference. More or fewer protocol layers can also be used in the protocol stack 50.

Internet Protocol Data Packets

Figure 3:
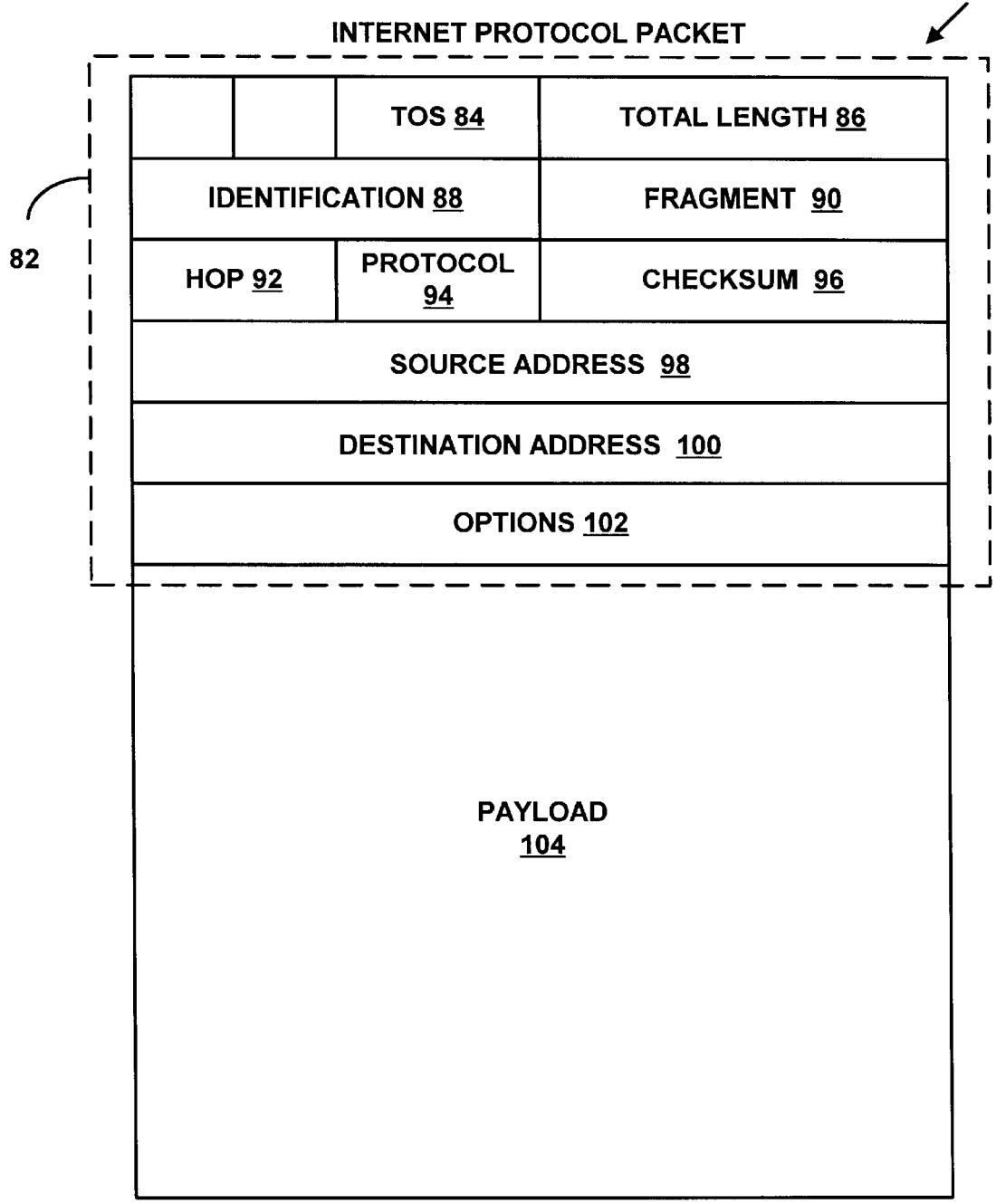
FIG. 3 is a block diagram illustrating the structure of an Internet Protocol packet.

The IP 58 layer transmits and routes IP 58 packets. FIG. 3 is a block diagram illustrating the structure of an IP 58 packet. The IP 58 packet 80 includes a header field 82 and a payload field 104. The payload field 104 of the IP 58 packet 80 typically comprises the data that is sent from one network device to another. However, the payload field 104 may also comprise network management messages, such as ICMP 56 messages, or data packets of another protocol such as UDP 60, TCP 62, FTP 68, or DHCP 66.

The header field 82 includes a type of service ("TOS") field 84, a total length field 86, an identification field 88, a fragment field 90, a number of hops ("HOP") field 92, a protocol field 94, and a header checksum field 96. For more information on the structure of an IP58 packet 80 see RFC-791 incorporated herein by reference. The source address field 98 may contain the IP 58 address of the network device that transmitted the IP 58 packet 80 onto the data network 10. The destination address field 100 may contain the IP 58 address of the network device that is the intended recipient of the IP 58 packet 80 on the data network 10. The IP 58 header field 82 may also include an options field 102 and other fields known to those skilled in the art.

Constant Bitrate Channel

Currently, the Internet Protocol only has one type of service: best effort. All data traffic is delivered end-to-end via some queuing mechanism, e.g. via first-in-first-out ("FIFO") queues at intermediate routers. End-to-end bandwidth, delay, and delay variation cannot be reserved. Recently, the Internet Engineering Task Force (IETF) has moved towards standardizing two types of CBR channels: the integrated services guaranteed bitrate channel and the differential services virtual leased line channel. Each may provide a point-to-point virtual circuit with dedicated capacity, low delay, and extremely low delay variation (also referred to as "jitter" by those skilled in the art).

For example, a guaranteed bitrate channel may be established between the first network device 14 and the second network device 16 as follows:

1. An application or a user requests some amount of end-to-end bitrate (e.g., 64 kbps) and a transmission profile (i.e., token bucket parameters);
2. Via hop-by-hop signaling, the data network 10 determines if a channel of said bitrate can be established between the first network device 14 and the second network device 16;
3. If the request is successful, the CBR application or user on the first network device 14 is notified and the data network 10 instructs each router (24,26) on the end-to-end path to reserve a portion of its capacity such that the requested bitrate can be maintained. An ingress router 24 (the first network device's 14 first-hop router) polices the first network device's 14 traffic so that it conforms to the token bucket specification that was requested.
4. The reservation remains in place until implicitly or explicitly torn down.

For more information on the integrated service guaranteed bitrate channel see RFC-2212 incorporated herein by reference.

As another example of a CBR channel, the differential services virtual leased line ("VLL") channel allows a CBR channel to be established between two hosts but with less overhead and complexity than that of guaranteed bitrate. VLL exploits the current architecture of an Internet, i.e. that of a large number of independently operated, autonomous networks. Within each network, an administrative entity is able to provide strong statistical guarantees on edge-to-edge bandwidth, delay and delay variation through a use of over-provisioning. However, at the peering points between the networks, there is no single administrative entity in charge of Quality of Service. Therefore, packets are often delayed and lost at these peering points, and the peer networks conveniently blame one another for the problems.

In order to overcome partially the delay and loss, the IETF differential services working group has redefined the IP 58 TOS field 84 to indicate a number of relative delay and drop priorities. For more information on the differential services virtual leased line and the usage of the IP 58 TOS field 84 see RFC-2475 and RFC-2598 incorporated herein by reference. CBR applications or gateways (24, 26) must mark the TOS field 84 with the appropriate bit pattern for each type of traffic contained in the packet. For example, real-time audio packets should be marked indicating low delay, while bulk transfer packets should be marked indicating low loss. Routers (24, 26) will forward packets with low delay priority in favor of those with higher delay priorities, and will drop packets with low drop precedence before those with high drop precedence. The particular scheme that a router uses is not defined but may be strict priority, weighted round robin, or some other discipline.

An expedited forwarding ("EF") byte has been defined so that the VLL service can be built on top of it. When an IP 58 packet 80 is marked with the EF byte, a router must forward that data packet before all other EF packets that arrive later, and the packet must not be dropped. The VLL service between a first network device 14 and a second network device 16 is established as follows:

1. An application or a user requests some amount of end-to-end bitrate (e.g., 64 kbps);
2. The request is signaled from peering point to peering point to determine if a channel of the requested bitrate can be established;
3. If the request is successful, the application or the user on the first network device 14 is notified. An ingress router 24 polices the first network device's 14 traffic so that it transmits at the requested rate via a leaky bucket scheme; and
4. The reservation remains in place until implicitly or explicitly torn down.

The advantage of this scheme over that of guaranteed rate is that the number of routers (24, 26) that need to be signaled grows linearly with the number of networks between the first network device 14 and the second network device 16, and that no computationally intensive scheduling processes are required at routers. On the other hand, VLL requires strong admission control: the network should only accept requests for which it can guarantee capacity. The calculation of such capacity is presently not well understood. Additionally, all routers would be required to support recognition of the EF byte in the TOS field 84.

A CBR channel may be established between CBR applications that explicitly request a certain constant bitrate in a function call. Alternately, a CBR channel may be associated with a particular type of application in a lower layer of the protocol stacks. For example, a VoIP application may be assigned a different constant bitrate compared to a web browsing application even though neither application explicitly demanded a particular constant bitrate. The association of a CBR channel to the application and the assignment of its bitrate may be performed by the lower layer of the protocol stack and not accessible by the application layers.

TCP Behavior

One use of TCP 62 guarantees the sequential delivery of data packets from a source application to a destination application. If packets are lost or arrive corrupted, they are retransmitted. Furthermore, TCP 62 attempts to monitor congestion on a data network 10 and it adjusts its transmission rate accordingly. Flow control processes are chosen in an attempt to allocate bandwidth fairly when streams of data are competing for limited network resources. TCP 62 implements its flow control by using sliding windows. The sliding windows allow a transmitting network device hosting the source application to transmit multiple packets to a receiving network device hosting the destination application without having to wait for an acknowledgement. Flow control driven by the receiving network device is referred to as flow control whereas flow control driven by the transmitting network device is referred to as congestion control.

A TCP 62 connection between the first network device 14 and the second network device 16 is established by a three way handshake, known to those skilled in the art. During the connection setup between the first network device 14 and the second network device 16, the TCP 62 process on the second network device 16 has the option of sending a maximum segment size ("MSS") to the TCP 62 process on the first network device 14. This is done to prevent fragmentation of packets on links that lead to the receiving network device. The default value used is typically 536 bytes although other values may be used. Typically, if a larger maximum segment size is acceptable by the data network 10 it will result in a greater maximum throughput.

During the exchange of data packets and acknowledgement packets ("ACKs"), flow control is effected by the second network device 16 (the receiving network device) which advertises to the first network device 14 (the transmitting network device) an offered window ("awnd") representing how much data the second network device 16 can currently accept without overflowing its buffer. The second network device's 16 usable window is defined as the amount of data that can be currently sent given the offered window and the outstanding unacknowledged packets. Different implementations of TCP 62 have different default offered windows. Typical values are 2048 byte send and receive buffers or 4096 byte send and receive buffers.

Congestion control is more complicated. A TCP 62 sender has a very limited number of methods to perceive network congestion. Three indications of congestion are perceived packet loss, fluctuating round trip delays, and duplicate acknowledgements (ACKs). Given the limited amount of information and the delay in receiving feedback from the data network 10, it is difficult for TCP 62 to adapt quickly to the network conditions.

TCP 62 typically uses packet loss to infer that congestion has occurred in the network. Errors on the physical links of typical modem data networks occur relatively rarely due to improvements in long-haul physical media such as fiber-optic cable. Wireless links, however, are still prone to error. As the physical loss rate is typically very small, much less than one percent, any data packet that is not acknowledged is considered a loss due to congestion. Data packets that are deemed to contain errors when received by the second network device 16 are destroyed at the receiver and do not get acknowledged. When network congestion is recognized by the first network device 14, by the absence of acknowledgement packets, the TCP 62 process on the first network device 14 limits the rate at which it injects packets into the network. To perform this task, the TCP 62 process on the first network device 14 alters the value of a congestion window ("cwnd"). The congestion window is the maximum number of outstanding bytes allowed in the data network 10. The window is multiplicatively decreased in the presence of congestion and additively increased when congestion is not detected. This behavior allows for constant feedback to changing conditions on the data network 10 without swamping the data network 10 with traffic.

The TCP 62 process on the first network device 14 maintains a running estimate of roundtrip delay time ("RTT") and delay variance ("A") to determine whether packet loss has occurred. The estimates are based on measuring a time between when a data packet is transmitted by the first network device 14 and its acknowledgement arrives from the second network device 16. These observations are typically run through a smoothed estimator to dampen the influence of recent trends as is illustrated in Equation (1):

$$RTT = RTT + g(M - RTT) \qquad (1)$$

where g is the gain factor for the most recent measurement, M. Typically g is set to one eighth so that it can be applied to the equation with an efficient shift operation. The variance of delay, A, is estimated by keeping a similar running estimate of the mean absolute delay. A TCP 62 retransmission timer is typically set as is illustrated in Equation (2):

$$RTO = RTT + 4A. \qquad (2)$$

After transmitting a data packet, if the first network device 14 does not receive an acknowledgement packet from the second network device 16 within time RTO, then the data packet is retransmitted.

Figure 4:
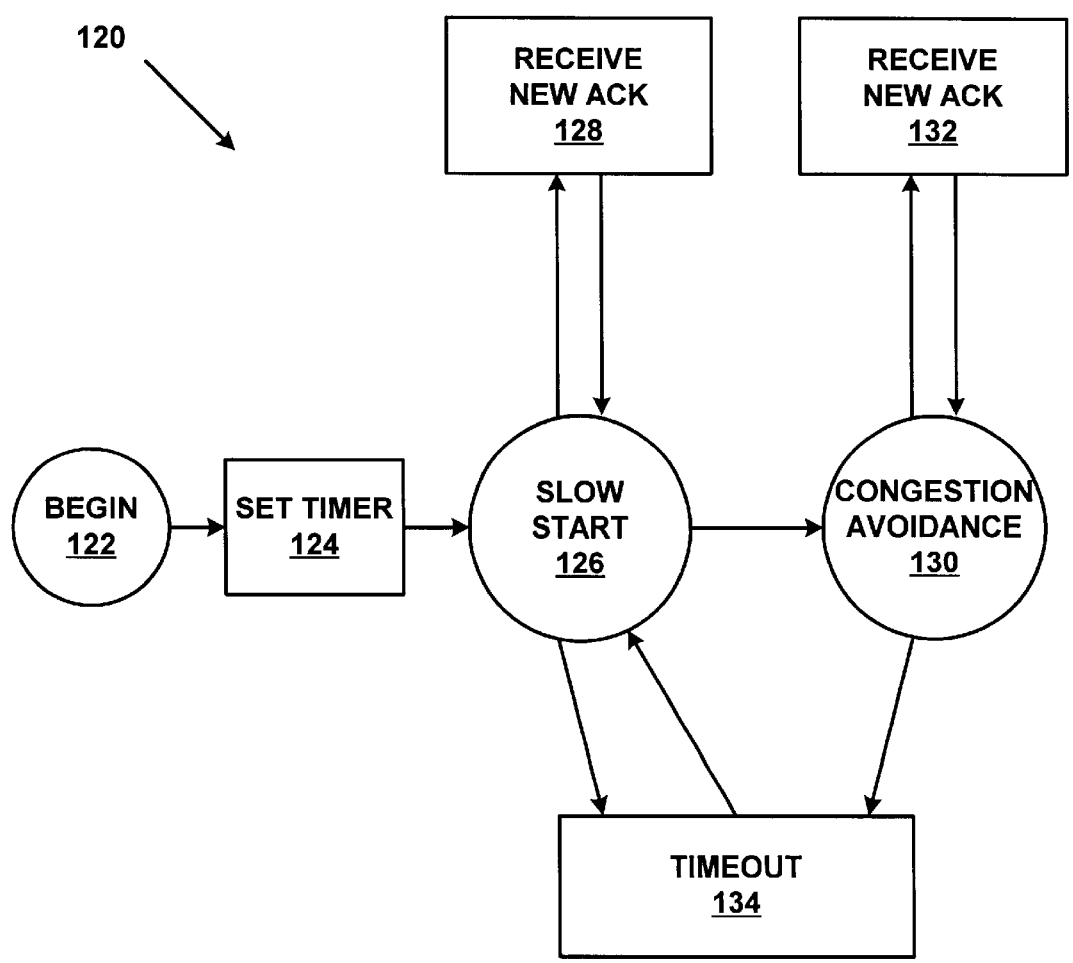
FIG. 4 is a block diagram illustrating states of a Transmission Control Protocol.

FIG. 4 is a block diagram illustrating states 120 of a Transmission Control Protocol 62. For more details on TCP 62 congestion control, see RFC 2581 which is incorporated herein by reference. After a connection setup, the TCP 62 process on the first network device 14 is in the beginning state 122. In the beginning state 122, the congestion window is set to an initial window value ("IW"). Typically, IW is MSS, although recent research has shown that setting IW to 2 or 4 times MSS may have a number of advantages. In particular, when communicating with a second network device 16 that uses delayed ACKs, an IW greater than MSS will eliminate unnecessary delay for the first packet. Additionally, transaction-oriented connections, such as electronic mail or hypertext markup connections, typically transmit a small amount of data per connection. A sufficiently large IW may be able to transmit all of this data in one window, greatly increasing transaction speed. On the other hand, increasing IW beyond 1 or 2 times MSS increases the burstiness of TCP 62 and chances of packets being dropped due to congestion. Additionally, in the beginning state 122, a threshold value is set for a transition from a slow start phase 126 to a congestion avoidance phase 130. The value of this threshold ssthresh is set to the offered window awnd from the second network device 16.

Once the parameters of the TCP 62 process have been initialized in the beginning state 122, the first network device 14 transmits the initial window of data and sets the return trip timer. The TCP 62 process then enters the slow start phase 126. The slow start phase 126 is one of the congestion control components of the TCP 62. Combined with the congestion avoidance phase 130, it provides a tentative probing of end-to-end network bandwidth by increasing cwnd only when the first network device 14 receives a new ACK 128. During slow start 126, the congestion control window size is increased on every new ACK reception 128. The rate at which packets are introduced into the data network 10 are gated according to the rate that ACKs are returned to the first network device 14, thus maintaining conservation of flow between the first network device 14 and the second network device 16.

When slow start 126 is entered, cwnd has already been set to IW at the beginning state 122. With each new ACK received 128 from the second network device 16, the first network device 14 increases the cwnd by MSS and resets the return trip timer. The number of transmitted segments effectively doubles with each successfully acknowledged cwnd, which is approximately every round trip time RTT. The slow start process 126 continues to receive new ACKs 128 and increase cwnd until either the offered window awnd, defined by the second network device 16, is reached or the threshold ssthresh is reached, signifying the transition into the congestion avoidance phase 130. However, if the first network device 14 does not receive an ACK, for any packet within time RTT+4A, it times out 134 and assumes that the oldest unacknowledged packet and all more recently transmitted packets were lost. This is usually an indication of significant congestion. At timeout 134, the oldest unacknowledged packet is retransmitted, the slow start threshold ssthresh is effectively set to half the value of cwnd before timeout, cwnd is set to MSS, the return trip timer is reset, and the TCP 62 process reenters the slow start phase 126.

The congestion avoidance phase 130 is a component of the TCP 62 congestion control that also prohibits overuse of capacity. The congestion avoidance phase 130 is entered when the congestion window crosses the slow start threshold cwnd>ssthresh or cwnd$\geq$ssthresh. Congestion avoidance 130 is entered when some form of congestion has been detected or the first network device 14 is likely to be approaching the maximum rate at which the second network device 16 can process data. The goal of this state is to very slowly increase cwnd so that the first network device 14 does not try to transmit more than the bandwidth available in the data network 10. The process for increasing cwnd differs in that cwnd grows linearly for every ACK received 132 from the second network device 16. Again, if a data packet is not acknowledged within time RTT+4A, the TCP 62 process times out 134 as described above and enters the slow start phase 126.

Figure 5:
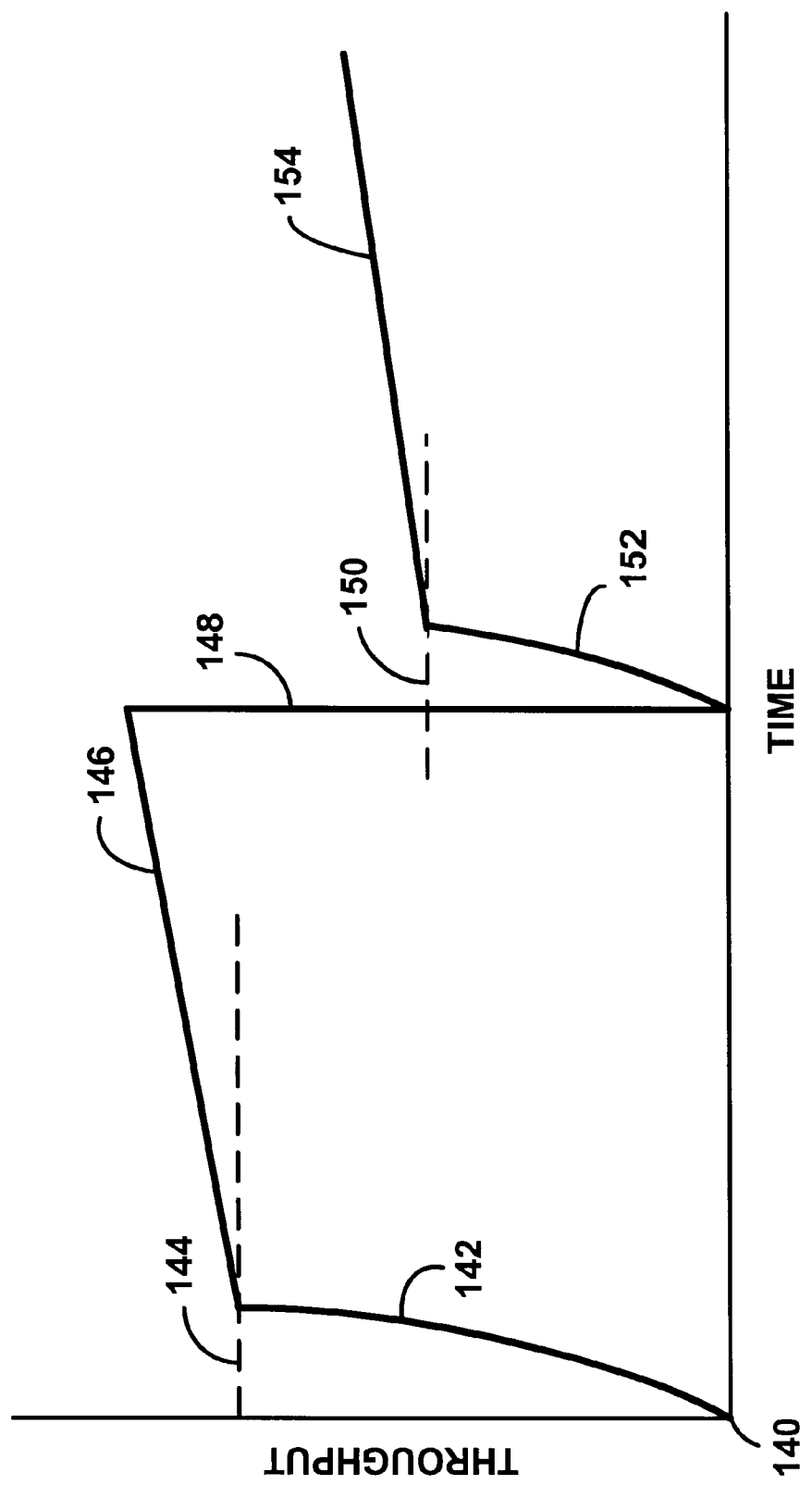
FIG. 5 is a diagram illustrating a time dependence of data throughput for a Transmission Control Protocol process.

FIG. 5 is a diagram illustrating a time dependence of data throughput from the first network device 14 to the second network device 16 for a TCP 62 process. The TCP 62 process starts in the beginning state 140 and enters the slow start phase 142. If the slow start phase 142 does not time out, the TCP 62 process enters the congestion avoidance phase 146 when the congestion window cwnd crosses the slow start threshold ssthresh 144. The congestion window and throughput increase linearly with time in the congestion avoidance phase 146 until the data network 10 is unable to support the packet insertion rate of the first network device 14. Packets are lost and not acknowledged and a timeout occurs 148. At timeout 148, the slow start threshold ssthresh is reset to half the last congestion window 150 and the TCP 62 process reenters the slow start phase 152. When the congestion window cwnd crosses the new slow start threshold ssthresh 150, the TCP 62 process enters another congestion avoidance phase 154.

FIG. 6 is a diagram illustrating the throughput of a TCP 62 process once it has reached equilibrium. The TCP 62 process goes through the slow start phase 160 until the congestion window crosses the threshold for entering the congestion avoidance phase 162. When timeout occurs 164, the cycle repeats itself. The slow start threshold 166 is half of the maximum congestion window 168 when the TCP 62 process has attained equilibrium.

In addition to the states of FIG. 4, the TCP 62 process may also allow for a fast retransmission and a fast recovery when duplicate ACKs are received by the first network device 14. Both processes may improve TCP 62 performance under conditions of light or transient congestion. Fast retransmission, for example, is an action that TCP 62 will take when it receives a third duplicate ACK. This circumstance indicates that at least one packet out of a flight may have been lost, but at least three subsequent packets have arrived successfully. Rather than reduce cwnd to MSS and enter slow start 126 (FIG. 4), TCP 62 immediately retransmits the packet it assumes to be lost (the last unACKed packet), decreases ssthresh to half of cwnd, and sets cwnd to be ssthresh+3 MSS. These adjustments reflect that since three packets after the "lost" packet were received, the sender may be able to transmit three more packets. A fast recovery state is entered after fast retransmission is performed.

Fast recovery waits for the last unACKed packet to be ACKed but allows the first network device 14 to transmit new packets if subsequently transmitted packets are ACKed. In fast recovery, TCP 62 assumes either that packets have been re-ordered by the network or that congestion is light or transient. When a duplicate ACK is received, it is assumed that congestion is not significant, and so cwnd is increased by MSS, allowing the sender to transmit another packet because a packet from the flight has been received by the second network device 16. When a new ACK is received, it indicates that all of the packets from the flight of the "lost" packet have been received. cwnd is set to ssthresh and congestion avoidance 130 is entered. If the TCP 62 sender times out 134 while in fast recovery, slow start 126 is entered.

Due to the additive-increase, multiplicative-decrease nature of TCP 62 at steady-state equilibrium, TCP 62 will underuse capacity if a single TCP 62 session is the only traffic on a CBR channel. FIG. 6 shows how TCP's 62 throughput increases linearly with cwnd until the maximum channel throughput 168 is attained. When cwnd increases beyond that amount, it is roughly cut in half, along with ssthresh 166. Then cwnd increases linearly again, after some slow start 160 and the cycle repeats. As can be seen from FIG. 6, TCP 62 uses only about threequarters of the available capacity of a CBR channel.

Optimizing Throughput on a CBR Channel

Figure 7A:
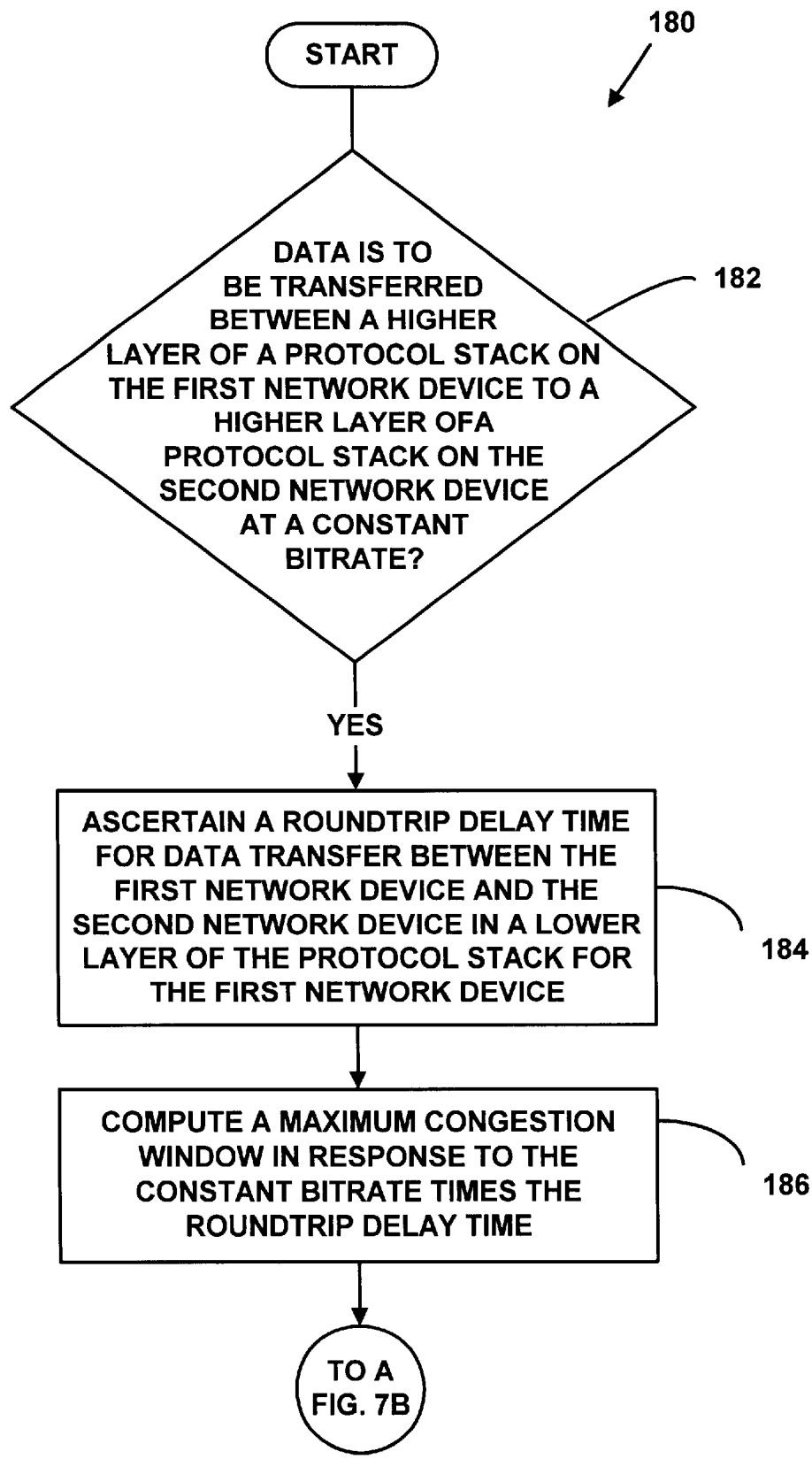
FIG. 7 is a flow diagram illustrating a method for optimizing data transfer in a data network.
Figure 7B:
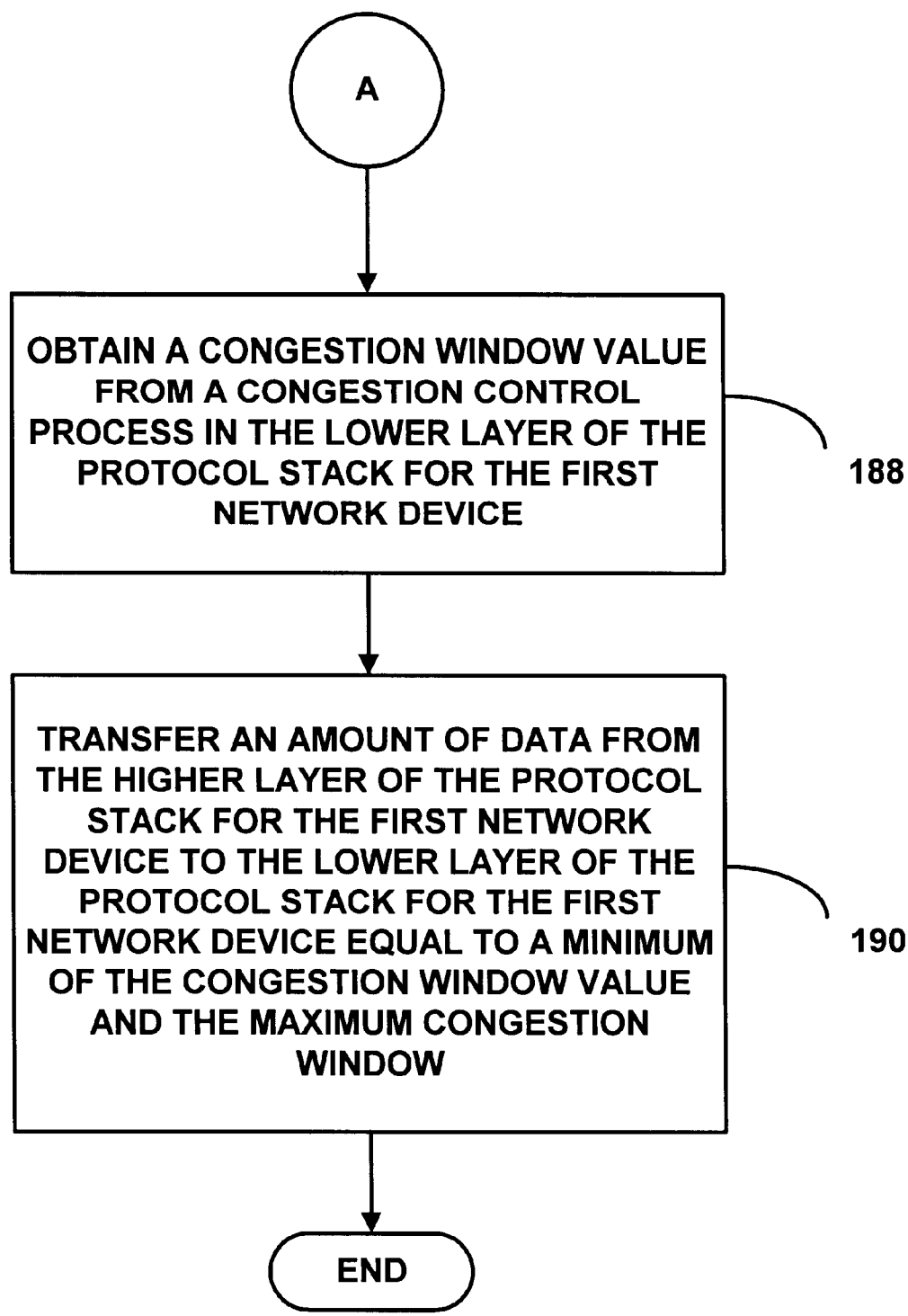

FIG. 7 is a flow diagram illustrating a Method 180 for optimizing data transfer in a data network 10. At Step 182, a test is conducted to determine whether data is to be transferred between a higher layer of a protocol stack for the first network device to a higher layer of a protocol stack for the second network device at a constant bitrate. If data is to be transferred at the constant bitrate, a roundtrip delay time for data transfer between the first network device and the second network device is ascertained in a lower layer of the protocol stack for the first network device at Step 184. In one exemplary preferred embodiment, the roundtrip delay time is a measure of congestion in the data network. At Step 186, a maximum congestion window is computed in response to the constant bitrate multiplied by the roundtrip delay time. A congestion window value is obtained from a congestion control process in the lower layer of the protocol stack for the first network device at Step 188. The congestion control process regulates the amount of data that is passed from the higher layer of the protocol stack to the lower layer of the protocol stack. At Step 190, an amount of data is transferred from the higher layer of the protocol stack for the first network device to the lower layer of the protocol stack for the first network device equal to a minimum of the congestion window value and the maximum congestion window. Method 180 may result in a near optimal throughput of constant bitrate data over the data network.

At Step 182 of Method 180, it is determined whether data is to be transferred between a higher layer of a protocol stack for the first network device 14 to a higher layer of a protocol stack for the second network device 16 at a constant bitrate. For example, the protocol stack may be the protocol stack 50 of FIG. 2. In another exemplary preferred embodiment of the present invention, Step 180 includes recognizing an identifier in the lower layer of the protocol stack 50 for the first network device 14 and determining whether the identifier is associated with a constant bitrate channel. The identifier is associated with the higher layer of the protocol stack 50 during a procedure for establishing a connection between the higher layer of the protocol stack 50 for the first network device 14 and the higher layer of the protocol stack 50 for the second network device 16. For example, the higher layers of the protocol stacks 50 for the respective network devices (14,16) may be application layers and the lower layers of the protocol stacks 50 for the respective network devices may be transport layers such as TCP 62 layers. However, it should be understood that the present invention is not restricted to application, transport, TCP 62 layers, or the OSI model and that other layers, protocol stacks, and network models are possible.

An application on the first network device 14 directs the TCP 62 layer on the first network device 14 to establish a virtual connection with another application on the second network device 16. Via IP 58 packets, the TCP 62 layers on the respective network devices undergo a three-way handshake procedure to establish a virtual connection between the TCP 62 layers and a virtual connection between the two applications. The amount of bandwidth that has been allocated to the CBR channel is available to the TCP 62 layers while the CBR channel is established. Additionally, the TCP 62 layers can determine the ports to which the applications are attached. In another exemplary preferred embodiment of the present invention, the identifier is a port number for a TCP 62 connection. For example, the TCP 62 process on the first network device 14 can determine from the TCP 62 connection set-up that data from the port attached to the application is to be transferred at a constant bitrate. The TCP 62 process on the first network device 14 recognizes that the port is associated with the application and is to be handled differently from other ports that are not attached to applications. When an application on the first network device 14 has data available for transmission to an application on the second network device 16, the TCP 62 process examines the port number. If the port number has been associated with a CBR application during a set-up procedure, the TCP 62 process will treat this data differently.

In yet another exemplary preferred embodiment of the present invention, the identifier is a Quality of Service ("QoS") identifier. QoS provides statistical guarantees of throughput, delay, delay variation, and packet loss. QoS is important in the transmission of VoIP, multimedia, and video data streams as these transmissions require a guaranteed bandwidth to function. Typically, IP 58 does not provide such guarantees on its own; 'P 58 only provides a best effort at delivering data packets to their destination. However, many types of network components may be capable of supporting QoS over an IP 58 connection. For example, Resource Reservation Protocol ("RSVP") allows for the advance reservation of channels with a guaranteed bandwidth. The request for the reservation is processed by the nearest gateway which then signals the request from device to device to the destination. Provided that the reservation is allowed on the network, a guaranteed bandwidth channel is established between the source and destination. For more information on RSVP, see RFC-2205 incorporated herein by reference.

In the present case, as is know by those skilled in the art, when a TCP 62 connection is set up between transport layers of the first 14 and second 16 network devices, a Quality of Service may be associated with that connection. The initiating application on the first network device may make a system call to establish the sending end of the TCP 62 connection. The system call may be associated with a particular QoS. An example of a system call is a socket call, known to those skilled in the art. The system call may include parameters that set control bits in a TCP 62 header and/or a bit pattern (e.g. the EF byte in the IP 58 TOS 84 field). The control bits and bit pattern may direct routers and/or gateways (24,26) to process data packets with these settings according to a CBR channel such as those mentioned above.

At Step 184 of Method 180, a roundtrip delay time for data transfer between the first network device and the second network device is ascertained in a lower layer of a protocol stack for the first network device. The roundtrip delay time is a measure of network congestion. In an exemplary preferred embodiment of the present invention, the TCP 62 layer maintains a running estimate for the value of RTT as described above.

A maximum congestion window ("cwnd*") is computed at Step 186. The maximum congestion window cwnd* is to be distinguished from the sliding congestion window cwnd described above. The value of the maximum congestion window is computed in response to the product b×RTT, where b is the value of the constant bitrate. For example, the size of a TCP 62 "pipe" between the first network device 14 and the second network device 16 is b×RTT. In current networks, RTT is expected to fluctuate, but in CBR channels, RTT is expected to be fairly stationary. The amount of bandwidth that has been allocated to the CBR channel is available to the TCP 62 layers while the CBR channel is established and so the value of the constant bitrate b is available to the TCP 62 process. b×RTT is the number of bits that can be unACKed at any one time between the first network device 14 and the second network device 16. Thus, TCP 62 is able to determine, from a given bitrate b and its running value of RTT, what its cwnd* value should be. In one exemplary preferred embodiment, the value of cwnd* is equal to b×RTT. In another exemplary preferred embodiment, cwnd* is equal to b×RTT scaled down by a constant factor or a percentage, e.g. between 90% and 100% of b×RTT, to provide room for error.

A congestion window value is obtained from a congestion control process in the lower layer of the protocol stack for the first network device 14 at Step 188. In one exemplary preferred embodiment, the congestion window value is cwnd as obtained from the TCP 62 process 120 of FIG. 4 and depicted in FIG. 6. The Method 180 may be implemented as a process running in the TCP 62 layer with access to the internal variables of the TCP 62 process. Alternatively, the Method 180 may be fully incorporated into TCP 62 to yield a newer version of the TCP 62 process that is optimized for data transfer including transfer at a constant bitrate.

At Step 190, the transfer of an amount of data is made from the higher layer to the lower layer of the protocol stack for the first network device equal to a minimum of the congestion window value and the maximum congestion window. In one exemplary preferred embodiment, a process is running in the TCP 62 layer that calculates cwnd* as described above and has access to cwnd from a TCP 62 process. Ordinarily, TCP 62 increases cwnd until there is a timeout when data packets are unACKed or there are duplicate ACKs. This behavior produces the characteristic "sawtooth wave" effect of FIG. 6. However, if the amount of data transferred is never increased beyond cwnd*, a timeout will not happen and the first network device's 14 data throughput is more likely to remain constant, near the given bitrate b.

Data transfer across the interface between the higher and lower layers of the protocol stacks may occur by methods known to those of ordinary skill in the art. For example, the process running in the application layer of the first network device 14 may make a function call requesting the TCP 62 layer to transport some data to the second network device 16. The TCP 62 may accept the data and provide a return from the function call that allows the process to continue. The TCP 62 layer may retain data in a buffer until it has accumulated cwnd of data, at which point the TCP 62 process requests that the IP 58 layer further encapsulates and sends the data to the second network device 16.

In another exemplary preferred embodiment, the TCP 62 process limits itself so that cwnd is never increased beyond cwnd*. Step 190 of Method 180 includes determining whether cwnd is greater cwnd*, and if so, replacing the cwnd with the cwnd* in the TCP 62 process. The amount of data transferred from the application layer to the transport layer of the protocol stack 50 is equal to cwnd*. A TCP 62 process that limits itself so that cwnd is never increased beyond cwnd*, may not provoke a timeout and the first network device's 14 TCP 62 throughput is more likely to remain constant. In these embodiments, all other aspects of TCP 62 are essentially unchanged. For example, if a packet is unACKed, cwnd is reduced to MSS as before. This will guarantee that a TCP 62 layer including the above-described Method 180 will still exhibit TCP's 62 characteristics when not using a CBR channel to itself.

Figure 8:
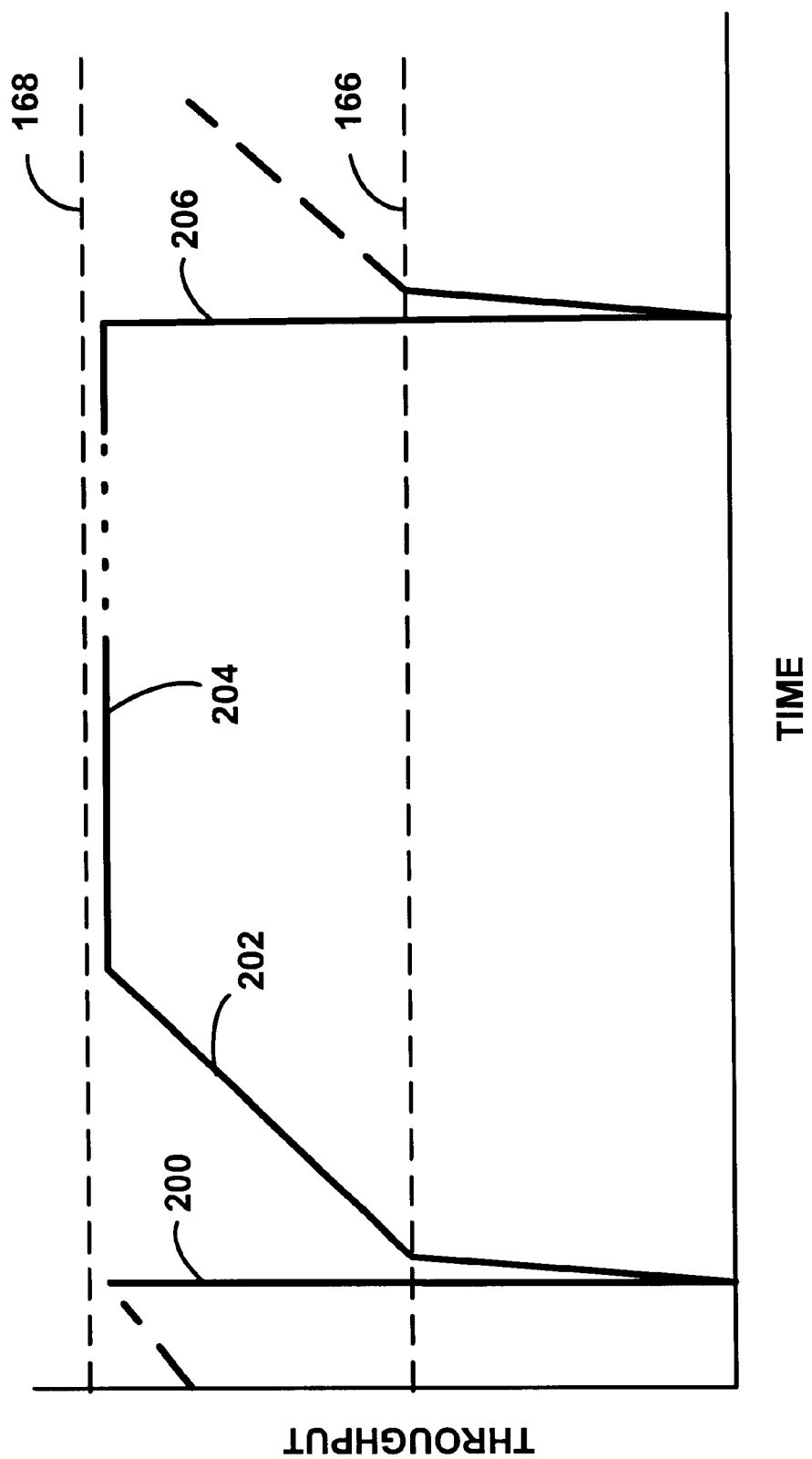
FIG. 8 is a diagram illustrating the throughput of an optimized congestion control process for a constant bitrate channel.

FIG. 8 is a diagram illustrating the throughput of an optimized congestion control process for a constant bitrate channel as described above. After a timeout 200, the congestion window and throughput increase according to an existing TCP 62 process. Above ssthresh, the value of cwnd will increase linearly 202 until it reaches the value of the maximum congestion window cwnd* 204. The value of cwnd* 204 is computed in response to the product of the continually updated return trip time RTT and the constant bitrate b for the CBR channel. The throughput is prevented from overextending beyond the capacity 168 of the channel and periodically suffering timeouts, after which the throughput is effectively halved 166 and the gradual increase of throughput is begun again. For the constant bitrate channel described herein, the throughput stops short of overextending itself and more fully and efficiently uses the capacity of the channel. The throughput may remain at the optimal level for extended periods of time but may face an occasional timeout 206 from fluctuations in the round trip delay time. As can be seen from FIG. 8, TCP 62 uses close to all of the available capacity of a CBR channel. In addition, the Method 810 for optimizing data transfer is essentially independent of the version of TCP 62 that is running in the transport layer.

Timeout Values for Constant Bitrate Channels

In general, the current TCP 62 value of the timeout RTO, as described above, is computed for a variable-delay, jittery environment. If roundtrip delay time variability A is zero or near zero, the RTO will approach RTT. When this is the case, if there is occasional delay jitter, it will cause the TCP 62 sender to timeout and retransmit, even if the packet is not lost. For example, assume that RTT=100 ms and RTO=105 ms. If a packet's acknowledgement arrives after 106 ms, then the sender will timeout and retransmit the packet, and go into slow start 126, which dramatically drops the sender's throughput. However, the retransmission is unnecessary because packet does arrive, although slightly too late. The problem is that the timeout value RTO is not conservative enough for a constant bitrate service.

FIG. 9 is a flow diagram illustrating a Method 210 for optimizing data transfer in a data network. At Step 212, it is determined whether data is to be transferred between a higher layer of a protocol stack for the first network device to a higher layer of a protocol stack for the second network device at a constant bitrate. If data is to be transferred at the constant bitrate, a roundtrip delay time for data transfer between the first network device and the second network device in a lower layer of the protocol stack for the first network device is ascertained at Step 214. The roundtrip delay time is a measure of congestion in the data network. At Step 216, a retransmission time value is computed to be proportional to the roundtrip delay time. The retransmission time value is different than for data transfer at a non-constant bitrate. A data packet is transmitted from the first network device to the second network device at Step 218. The data packet is associated with the data that is transferred at the constant bitrate. At Step 220, it is determined whether an acknowledgement packet for the data packet is received by the first network device from the second network device within the retransmission time value. If no acknowledgement packet is received, the data packet is retransmitted from the first network device to the second network device at Step 222. Method 210 may result in a near optimal throughput of constant bitrate data over the network.

As discussed above, the first determining Step 212 of the Method 210 may be implemented by recognizing an identifier in a TCP 62 layer that is associated with a CBR channel. Such an identifier may be a TCP 62 port value or a QoS identifier. The roundtrip delay time RTT of Step 214 may be the running estimate of the RTT value that is continually updated by the TCP 62 process as described above.

At Step 216 of Method 210, a retransmission time RTO* is computed for data packets on the CBR channel that is proportional to the roundtrip delay time value RTT, i.e. RTO* $\propto$ RTT. This value is different than the above-described value RTT+4A for virtual data channels that are not transmitting constant bitrate traffic. In one exemplary preferred embodiment of the present invention, the retransmission time value is between one and two times the roundtrip delay time, i.e. RTO*=(1 to 2) RTT. For example, the RTO* could be prevented from reaching values less than 10%, 50%, or 100% over the RTT.

At Step 218 a data packet for a CBR channel is transmitted to the second network device 16 and a retransmission timer is set for the CBR channel. If there is no acknowledgement packet received by the first network device 14 when the retransmission timer reaches RTO* at Step 220, the data packet is assumed lost and it is retransmitted at Step 222. The more conservative retransmission time may optimize the data flow in a CBR channel because data flow on a CBR channel has a higher expectation of being reliably delivered to the second network device 16.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or component may be used in the block diagrams.

The claims should not be read as limited to the described order or elements unless stated to that effect. In addition, use of the term"means" in any claim is intended to invoke 35 U.S.C. §112, paragraph 6, and any claim without the word- "means" is not so intended. Therefore, all embodiments that come within the scope and spirit of the following claims and equivalents thereto are claimed as the invention.

We claim:

1. In a data network, a method for optimizing data transfer from a first network device to a second network device, the method comprising the steps of:

determining whether data is to be transferred between a higher layer of a protocol stack on the first network device to a higher layer of a protocol stack on the second network device at a constant bitrate, and if so, ascertaining a roundtrip delay time for data transfer between the first network device and the second network device in a lower layer of the protocol stack on the first network device, wherein the roundtrip delay time is a measure of congestion in the data network, computing a maximum congestion window in response to the constant bitrate multiplied by the roundtrip delay time, obtaining a congestion window value from a congestion control process in the lower layer of the protocol stack on the first network device, wherein the congestion control process regulates the amount of data that is passed from the higher layer of the protocol stack to the lower layer of the protocol stack, and transferring an amount of data from the higher layer of the protocol stack on the first network device to the lower layer of the protocol stack on the first network device equal to a minimum of the congestion window value and the maximum congestion window.

2. A computer readable medium having stored therein instructions for causing a central processing unit to execute the method of claim 1.

3. The method of claim 1 wherein the maximum congestion window is equal to the constant bitrate multiplied by the roundtrip delay time.

4. The method of claim 1 wherein the determining step further comprises the steps of:

recognizing an identifier in the lower layer of the protocol stack on the first network device, wherein the identifier is associated with the higher layer of the protocol stack on the first network device during a procedure for establishing a connection between the higher layer of the protocol stack on the first network device and the higher layer of the protocol stack on the second network device; and determining whether the identifier is associated with a constant bitrate channel.

5. The method of claim 4 wherein the identifier is a port number for a Transmission Control Protocol connection.

6. The method of claim 4 wherein the identifier is a Quality of Service identifier.

7. The method of claim 1 wherein the transferring step further comprises:

determining whether the congestion window value for the congestion control process is greater than the maximum congestion window, and if so, replacing the congestion window value with the maximum congestion window in the congestion control process, whereby the amount of data transferred from the higher layer of the protocol stack to the lower layer of the protocol stack is equal to the maximum congestion window.

8. The method of claim 1 wherein the lower layer of the protocol stack is a Transmission Control Protocol layer, the higher layer of the protocol stack on the first network device and the higher layer of the protocol stack on the second network device are application layers, and the congestion control process is a Transmission Control Protocol process.

9. In a data network, a method for optimizing data transfer from a first network device to a second network device, the method comprising the steps of:

determining whether data is to be transferred between a higher layer of a protocol stack on the first network device to a higher layer of a protocol stack on the second network device at a constant bitrate, and if so, ascertaining a roundtrip delay time for data transfer at the constant bitrate between the first network device and the second network device in a lower layer of the protocol stack on the first network device, wherein the roundtrip delay time is a measure of congestion in the data network, computing a retransmission time value proportional to the roundtrip delay time for the data transfer at the constant bitrate, wherein the retransmission time value is different than for data transfer at a non-constant bitrate, transmitting a data packet from the first network device to the second network device, wherein the data packet is associated with the data transfer at the constant bitrate, and determining whether an acknowledgement packet for the data packet is received by the first network device from the second network device within the retransmission time value, and if not, retransmitting the data packet from the first network device to the second network device.

10. A computer readable medium having stored therein instructions for causing a central processing unit to execute the method of claim 9.

11. The method of claim 9 wherein the retransmission time value is between one and two times the roundtrip delay time.

12. In a data network, a method for optimizing data transfer from a first network device to a second network device, the method comprising the steps of:

recognizing an identifier in a Transmission Control Protocol layer of a protocol stack on the first network device, wherein the identifier has been associated with an application layer of the protocol stack on the first network device during a procedure for establishing a Transmission Control Protocol connection between the application layer of the protocol stack on the first network device and the application layer of the protocol stack on the second network device;

determining whether the identifier is associated with a constant bitrate channel, and if so, ascertaining a roundtrip delay time for data transfer between the first network device and the second network device in the Transmission Control Protocol layer of the protocol stack on the first network device, wherein the roundtrip delay time is a measure of congestion in the data network, computing a maximum congestion window in response to the constant bitrate multiplied by the roundtrip delay time, obtaining a congestion window value from a Transmission Control Protocol process in the Transmission Control Protocol layer of the protocol stack on the first network device, wherein the Transmission Control Protocol process regulates the amount of data that is passed from the application layer of the protocol stack to the Transmission Control Protocol layer of the protocol stack, and transferring an amount of data from the application layer of the protocol stack for the first network device to the Transmission Control Protocol layer of the protocol stack on the first network device equal to a minimum of the congestion window value and the maximum congestion window.

13. A computer readable medium having stored therein instructions for causing a central processing unit to execute the method of claim 12.

14. The method of claim 12 wherein the maximum congestion window is equal to the constant bitrate multiplied by the roundtrip delay time.

15. The method of claim 12 wherein the identifier is any of a Quality of Service identifier or a port number for the Transmission Control Protocol connection.

16. In a data network, a method for optimizing data transfer from a first network device to a second network device, the method comprising the steps of:

determining whether data is to be transferred between an application layer of a protocol stack on the first network device to an application layer of a protocol stack on the second network device at a constant bitrate, and if so, ascertaining a roundtrip delay time for data transfer between the first network device and the second network device in a Transmission Control Protocol layer of the protocol stack on the first network device, wherein the roundtrip delay time is a measure of congestion in the data network, computing a retransmission time value between one and two times the roundtrip delay time, wherein the retransmission time value is different than for a data transfer at a non-constant bitrate, transmitting a data packet from the first network device to the second network device, wherein the data packet is associated with the data that is transferred at the constant bitrate, and determining whether an acknowledgement packet for the data packet is received by the first network device from the second network device within the retransmission time value, and if not, retransmitting the data packet from the first network device to the second network device.

17. A computer readable medium having stored therein instructions for causing a central processing unit to execute the method of claim 16.

* * * * *